INVENTOR
George F. Ritter, Jr.,
BY
Collins & Oberlin
ATTORNEYS

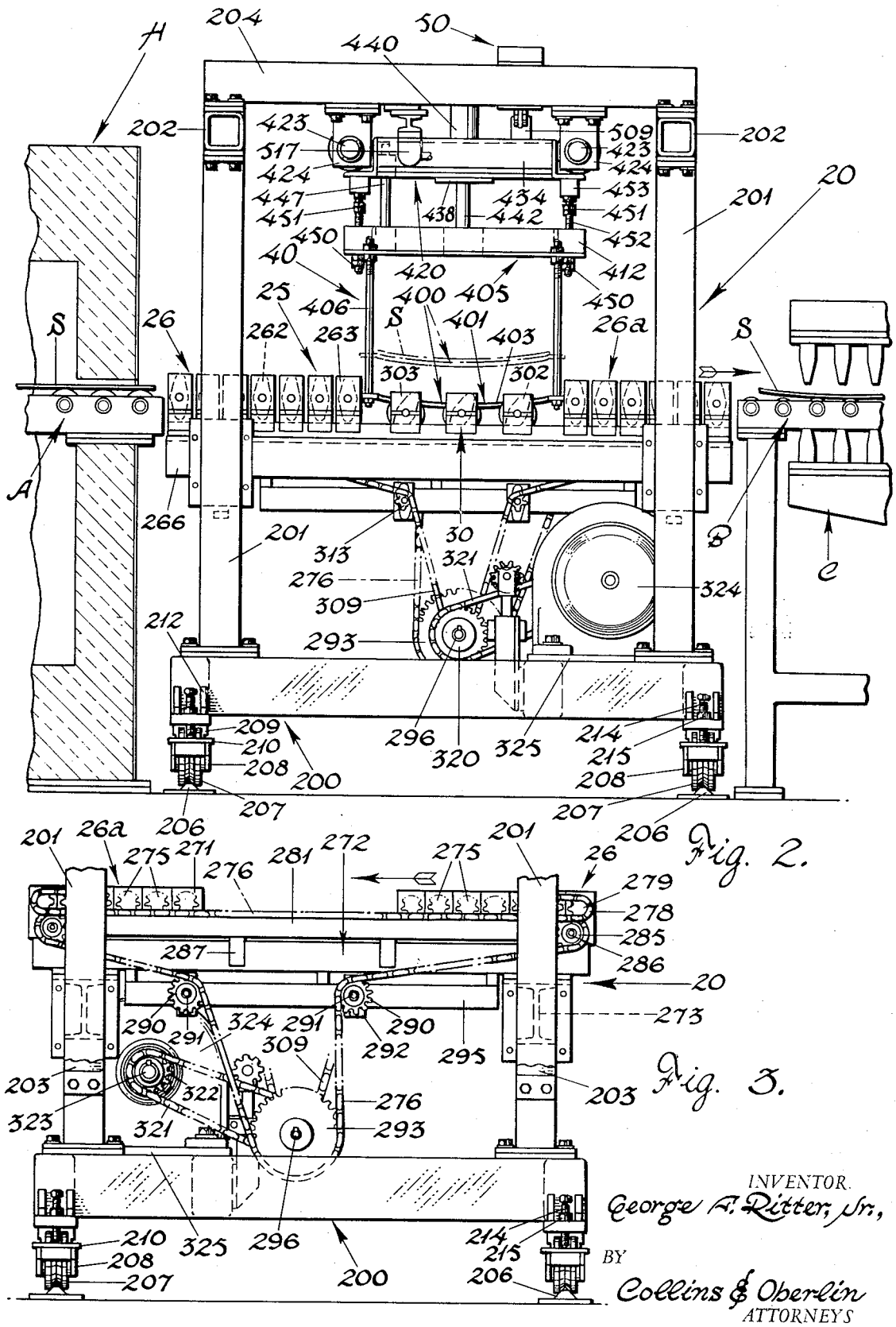

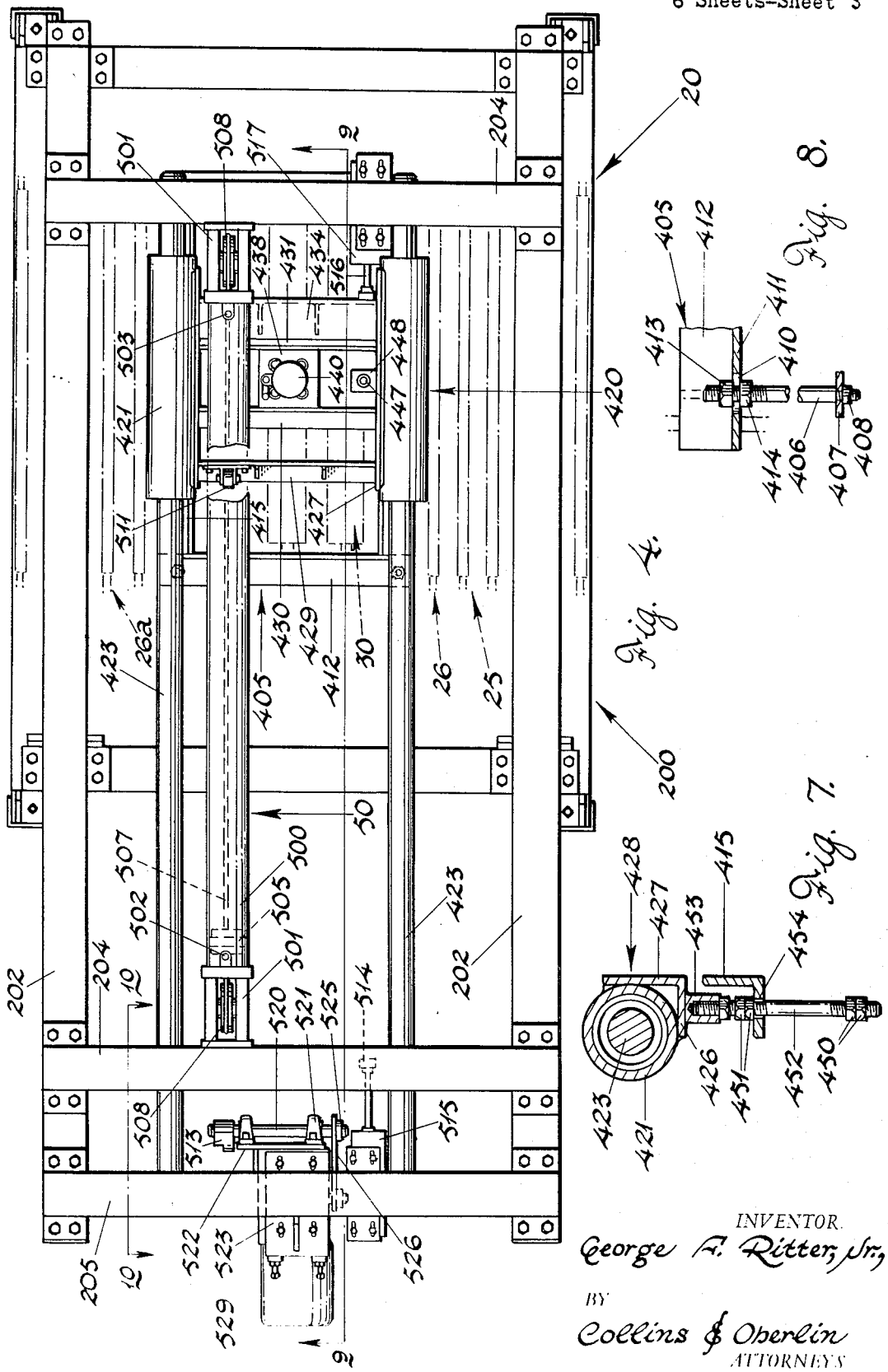

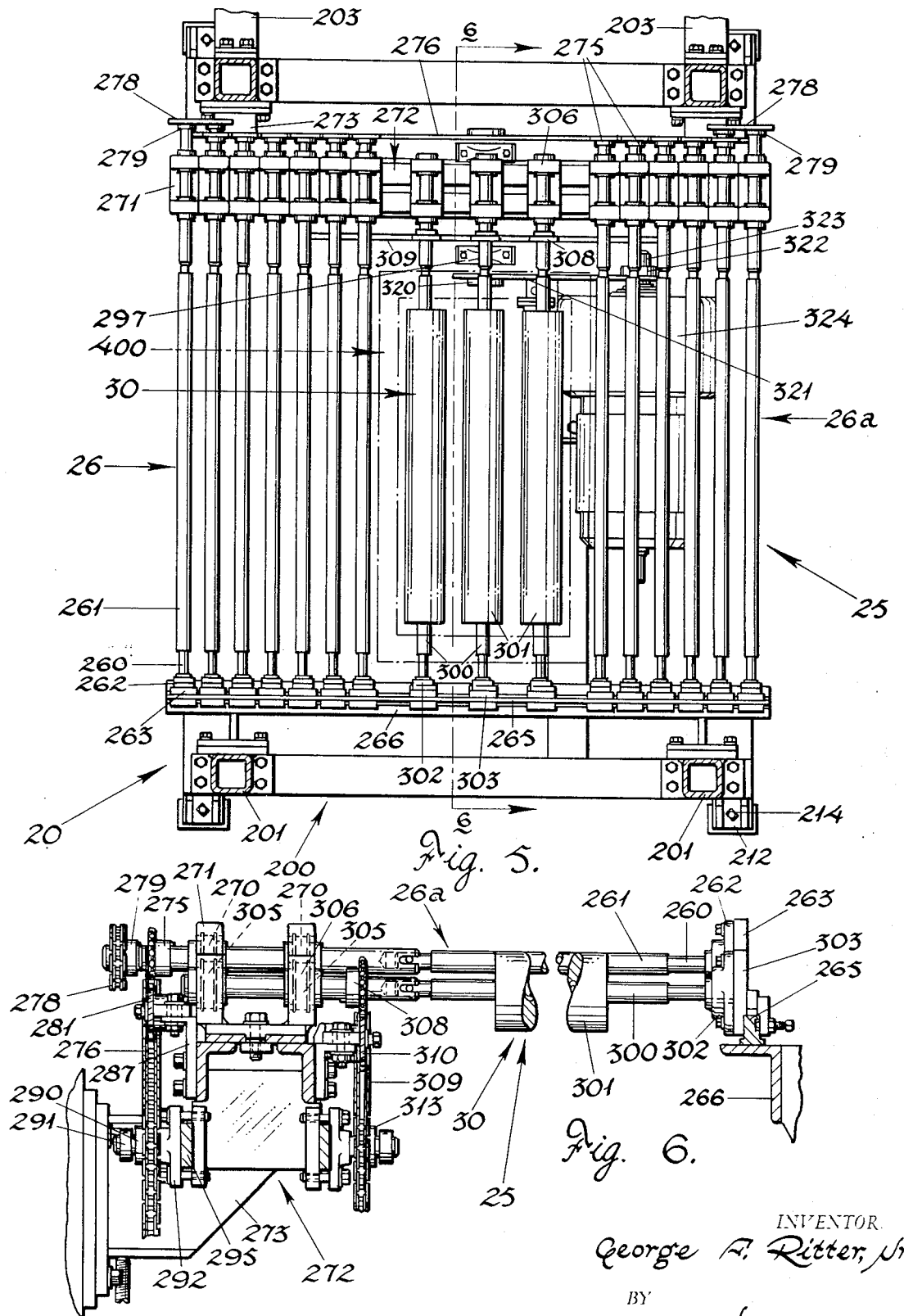

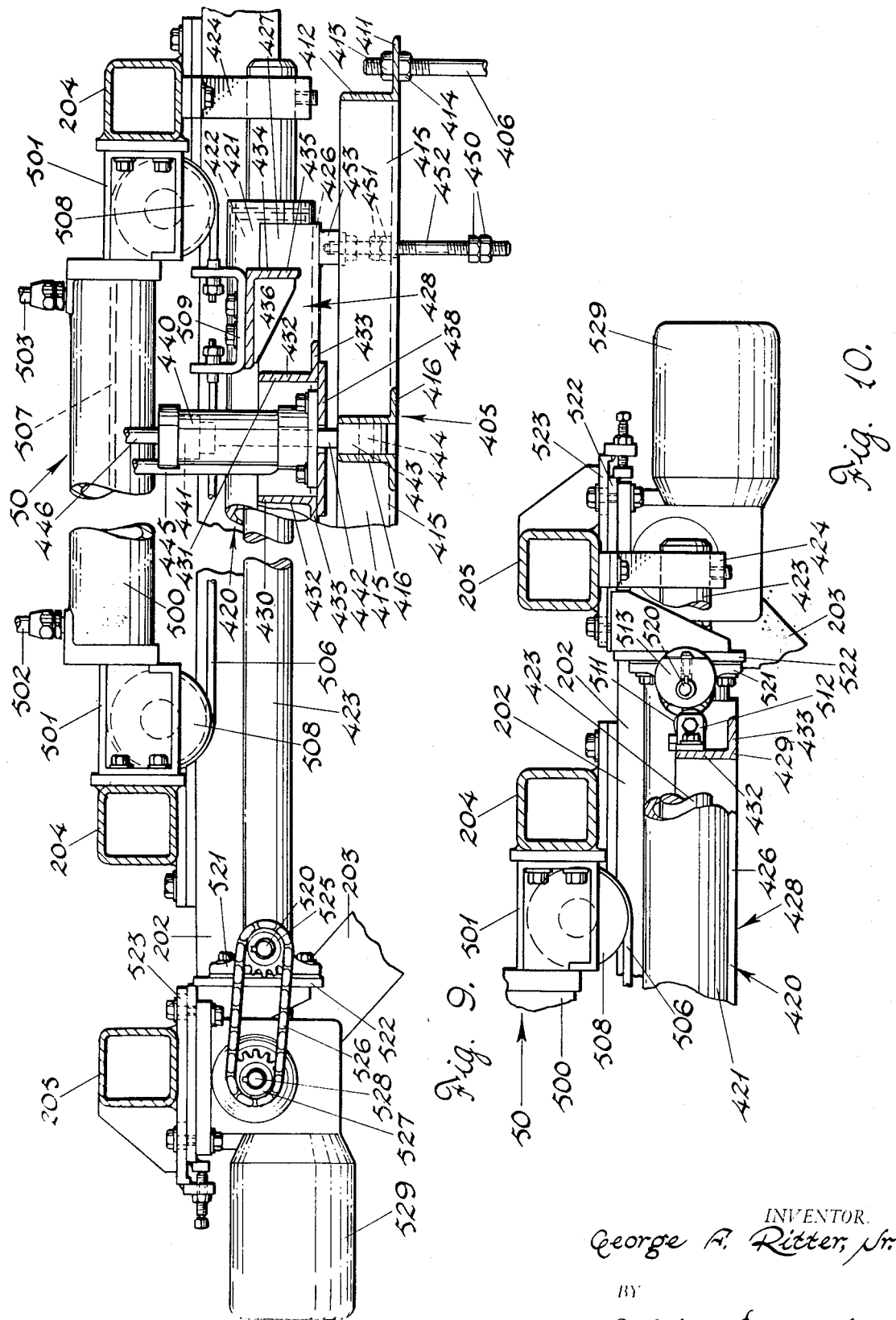

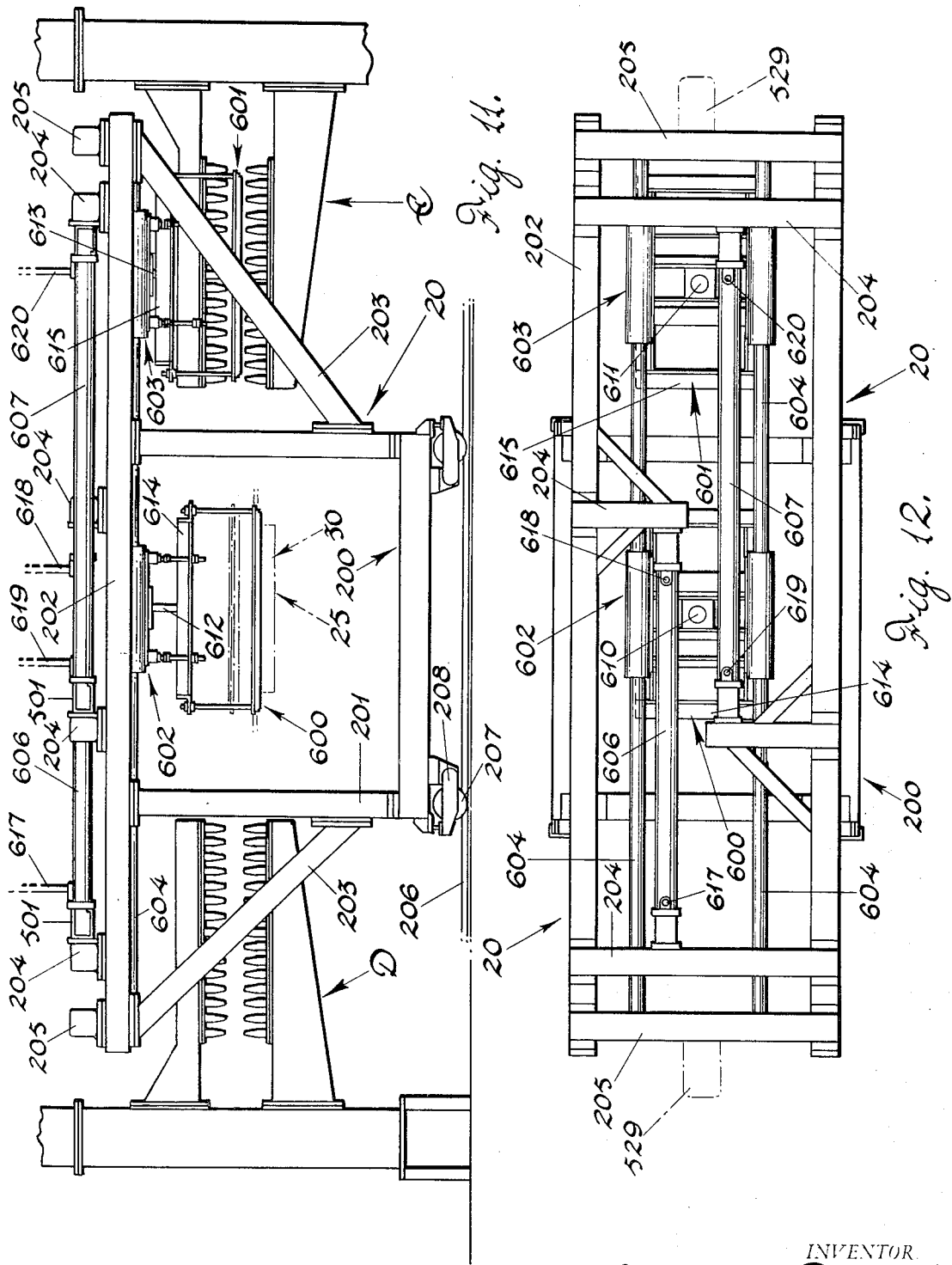

United States Patent Office 3,684,473
Patented Aug. 15, 1972

3,684,473
BENDING AND TEMPERING GLASS SHEETS
George F. Ritter, Jr., Toledo, Ohio, assignor to
Libbey-Owens-Ford Company, Toledo, Ohio
Filed Aug. 28, 1970, Ser. No. 67,838
Int. Cl. C03b 23/02
U.S. Cl. 65—104
8 Claims

ABSTRACT OF THE DISCLOSURE

A flat sheet of glass is heated to bending temperature during movement along a horizontal path and toward a ring type bending mold located beneath the path. When the heated sheet reaches a position directly over it, the mold is raised to lift the sheet bodily above the path and rapidly enough to cause it to sag and bend by inertia and gravity into contact with the shaping surface of the mold. The raised mold with the bent sheet thereon is then shifted laterally, first away from the path into an area where the sheet is rapidly chilled to temper it and then back into alignment with the path, after which the mold is lowered to return the bent and tempered sheet to the path for continued movement therealong.

BACKGROUND

Field of the invention

The present invention relates broadly to the production of bent and tempered glass sheets, and more particularly to an improved method of and apparatus for bending and tempering glass that is effective with very thin sheets.

Description of the prior art

Both the bending and tempering of glass sheets are of course old and well known and it has become common commercial practice to bend and temper relatively thick (¼" and up) sheets or plates. Also a new bending technique known as IG (inertia and gravity) bending has recently become known (U.S. patent to Ritter et al., 3,476,540).

However there is developing a rapidly expanding demand for extremely thin, bent tempered glass (i.e., ⅛" and under in thickness) for use in special laminated windshields, convertible backlights and elsewhere, particularly in the automotive field.

Every effort has been and is being made to meet this demand but it soon became evident that previously accepted procedures did not lend themselves to processing thin glass and that their successful bending and tempering presented a new and different set of problems (U.S. patent to O'Connell et al. 3,454,389).

SUMMARY OF THE INVENTION

This invention provides an improved method and apparatus for bending and tempering glass that are capable of producing thin bent tempered glass sheets on a commercial scale to rigid automotive requirements.

A primary object of the invention is the provision of a method and apparatus of this character which involves bending heated glass sheets into conformity with the shaping surface of a bending mold under the influence of inertial and gravitational forces and then rapidly chilling the bent sheets to temper them while they are still on the mold shaping surface.

A further object is to provide such a method and apparatus in which flat glass sheets are heated to bending temperature during movement along a horizontal path and are lifted from said path to effect bending, and in which sheets so bent are shuttled laterally first away from said path for rapid chilling to temper and then back to where they can be lowered into said path for continued movement along it.

Still another object is the provision of a method and apparatus of this kind in which alternate bent sheets are shuttled laterally in different directions for chilling.

Further objects and advantages will become apparent during the course of the following description, when read in connection with the accompanying drawings wherein like numerals refer to like parts throughout.

BRIEF DESCRIPTION OF THE DRAWINGS

FIG. 2 is a side elevation of the bending portion of the apparatus;

FIG. 3 is a similar elevation but from the opposite side of the apparatus and with the upper portion broken away;

FIG. 4 is a plan view of the apparatus of FIG. 1;

FIG. 5 is a horizontal sectional view taken on the plane of line 5—5 in FIG. 1;

FIG. 6 is a vertical sectional view taken on the plane of line 6—6 in FIG. 5;

FIG. 7 is a detail sectional view taken on the plane of line 7—7 in FIG. 1;

FIG. 8 is a vertical, detail, sectional view taken on the plane of line 8—8 in FIG. 1;

FIG. 9 is a vertical sectional view taken on the plane of line 9—9 in FIG. 4;

FIG. 10 is a vertical sectional view taken on the plane of line 10—10 in FIG. 4;

FIG. 11 is an end elevational view of a modified form of apparatus; and

FIG. 12 is a plan view of the same.

DESCRIPTION OF THE PREFERRED EMBODIMENTS

Figure 1:
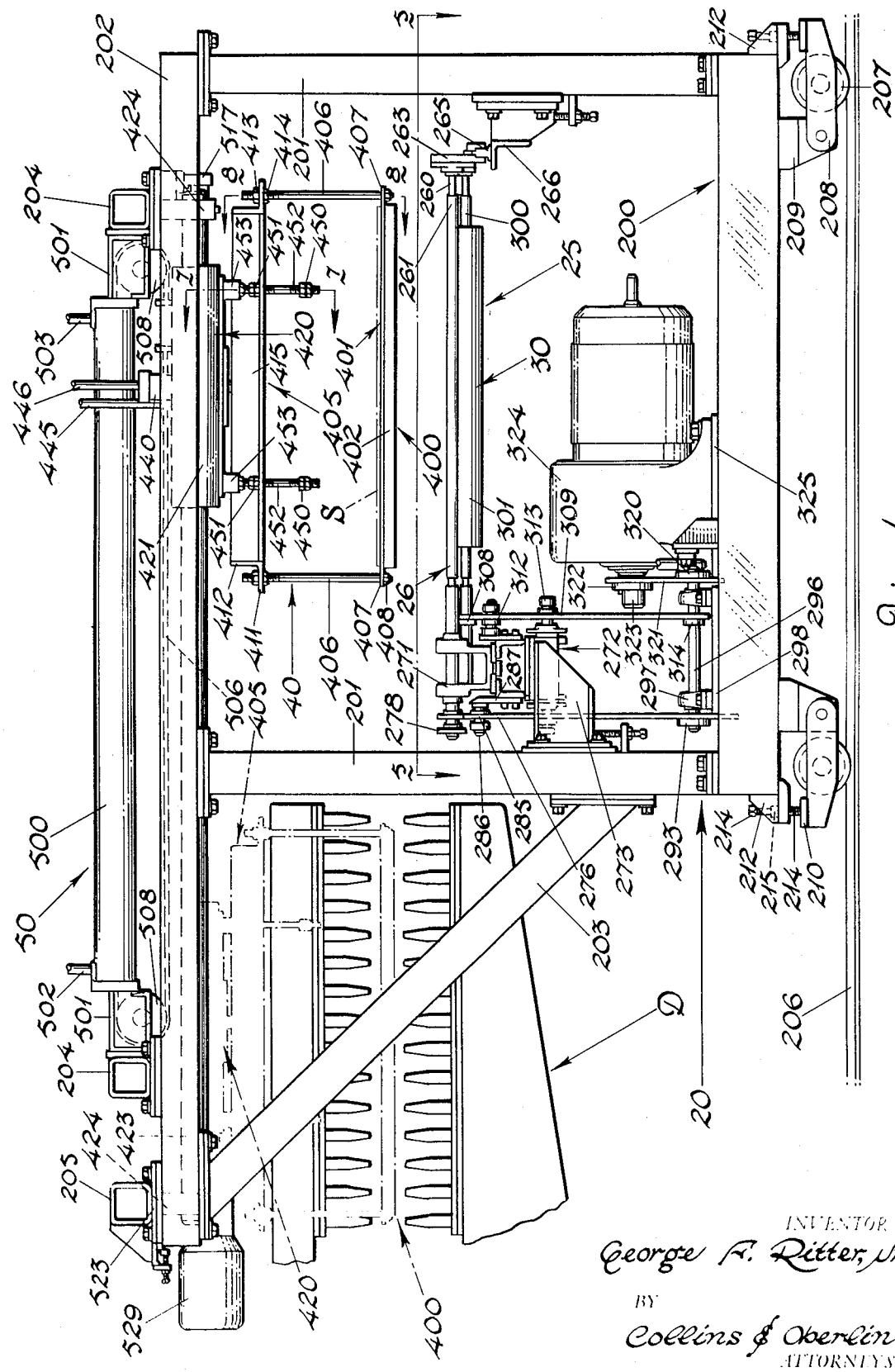
FIG. 1 is an end elevation of a bending and tempering apparatus constructed in accordance with the invention and with a part of the tempering portion broken away.

Referring now more particularly to the drawings, there is illustrated in FIGS. 1 and 2 an end and side view respectively of an apparatus designed to bend and temper glass sheets in accordance with this invention. In FIG. 2 a portion of a roller conveyor A is shown as moving a flat sheet or plate of glass S from a heating furnace H toward the entry end of the apparatus and, leading from the exit end, is a run-out conveyor B for receiving bent and tempered sheets from the apparatus and carrying them onwardly between oppositely disposed cooling blastheads C.

As earlier explained, the apparatus of the invention is particularly well adapted for bending and tempering relatively thin sheets of glass. By way of example, sheets of from about .125 to .090 of an inch in thickness have been successfully bent and tempered on, and subjected to further cooling while being conveyed from, this apparatus. As a practical matter the apparatus may be constructed as a substantially self-contained unit and has been so illustrated in the drawings wherein a portable framework, designated in its entirety by the numeral 20, is shown as carrying a roll conveyor 25, a sheet bending unit 40 and means, designated by the numeral 50, for moving the bending unit shuttle-wise from the full line position in FIG. 1 to the position shown in phantom line, in which position the bent sheet is located between oppositely disposed tempering blastheads D.

More specifically, the framework 20 of the apparatus includes a substantially rectangular base frame 200, vertically disposed posts 201 arranged in the corners thereof, and tubular members or beams 202 secured at the upper ends of the posts with their unsupported ends structurally sustained by braces 203. This framework is adapted to be bodily moved into and out of operative position, in which it is in alignment with the conveyors A and B, along parallel tracks or rails 206. To this end, grooved wheels 207, located at the respective corners of the base, are adapted to traverse the rails and are journaled in yoke-shaped arms 208. Each arm 208 is pivotally supported by a fixed bracket 209 and is provided with a plate 210 adjacent its outer end. Brackets 212 attached to the base are employed to support set-screws 214 that are threaded downwardly against the plates 210 and then locked by nuts 215. In this way, the base 200 can be "leveled" accurately in a suitably horizontal plane.

As best seen in FIGS. 2, 3, 5 and 6, the conveyor unit 25 includes a plurality of relatively small diameter rolls 26 in the entry area of the apparatus, a plurality of centrally located larger diameter rolls 30, and a plurality of rolls 26a, similar to the rolls 26, in the exit area of the apparatus; the axes of all of the rolls 26, 27 and 28 being arranged in parallel and transversely to the path of movement of the glass sheets. Since the rolls 26 and 26a are of the same structure and mounted and driven in the same manner a detailed description of one will suffice for all.

Thus, as best shown in FIGS. 5 and 6, each shaft 260 of these rolls is provided with a sleeve 261 of a material that will not mar or otherwise injure the softened undersurface of a heated sheet of glass. One end of each shaft is journaled in a bearing 262 supported on a plate 263 which, in one way or another, is mounted on a bar 265. Adjacent its ends, the bar 265 is mounted on post 201 by integral brackets 266. The opposite end of each shaft 260 is journaled in dual bearings 270 mounted in brackets 271 carried by a framework 272 supported adjacent its ends by bracket 273 on adjacent posts 201.

At its outer end, the shaft 260 mounts a fixed sprocket 275, and the plurality of sprockets are adapted to be driven by a substantially endless chain belt 276 in a manner to be shortly described. As will be seen in FIG. 5, the endmost shafts and sprockets are driven by a chain belt 278 also trained about a sprocket 279 on the next or adjacent inwardly disposed shaft. The chain belt 276 is supported by a plate 281 on the framework 272 in order that engagement with each sprocket 275 will be effected to mesh the teeth in the lower generatrix thereof. The chain belt 276 adjacent the ends of the framework 272 is trained about idler sprockets 285 having self-contained bearings and mounted on shafts 286 carried by plates 287 on the framework 272 (FIG. 1). The flights of chain belt 276 are further trained about idler sprockets 290, having contained bearings and mounted on shafts 291 fixed in brackets 292, and about a drive sprocket 293. As seen in FIGS. 3 and 6, each bracket 292 is mounted in fixed relation to the framework 272 by a bar 295 and, referring again to FIG. 1, the sprocket 293 is fixed on a shaft 296 journaled in bearings 297 supported by a platform 298 on the base 200.

As viewed in FIG. 5, the rolls 30 (upon which the glass sheets stop and are supported just prior to bending) are arranged in spaced parallel relation to the rolls 26 on one side and the rolls 26a on the other. The shafts 300 of the rolls 30 are provided with centrally disposed annular sections 301 of larger diameter than the sleeves 261 of the rolls 26 and 26a but upper surfaces of the rolls 30 are located in the same horizontal plane with the upper surfaces of the rolls 26 and 26a, whereby a glass sheet will be freely movable along a definite path in said plane. The reason for providing the larger diameter annular sections 301 is to accommodate positioning of the bending mold, later to be described, beneath the said path or plane as the sheet S (FIG. 2) arrives at a position to be received on the rolls 30. One end of each roll shaft 300 is journaled in a bearing 302 on a plate 303 mounted on the bar 265 (FIGS. 5 and 6). The opposite end of each shaft is journaled in dual bearings 305 supported by brackets 306 on the framework 272 and, inwardly of said brackets 306, mounts a sprocket 308.

In similar manner to the sprockets 275, the sprockets 308 are driven by a chain belt 309 that is supported beneath the sprockets on a bar 310 connected to the framework 272 and, as can be seen in FIGS. 1 and 2, the flights of the chain belt 309 are trained about idler sprockets 312 and 313 and about a drive sprocket 314 on the shaft 296. The shaft 296 has a fixed sprocket 320 which by chain belt 321 is coupled to a sprocket 322 on the output shaft 323 of a motor unit 324, mounted by platform 325 on the base 200.

The bending mold 400 of the bending unit 40, as illustrated in phantom line in FIG. 5, is an open ring-type structure which will engage and support only the marginal portions of a glass sheet to avoid marring of portions of the undersurface of the sheet within what becomes the viewing area of a window when the sheet is installed. Thus, the shaping surface 401 of the mold is defined by what may be substantially straight or flat side sections 402, as viewed in FIG. 1, and end sections 403 that have curved surfaces as shown in FIG. 2 conforming to the contour desired in a bent sheet.

This mold 400 is bodily carried by a frame 405 through rods 406 which, as shown in FIG. 8, are secured at their lower threaded ends to corner tabs 407 of the mold by nuts 408. At their threaded upper ends, the rods 406 are passed through slots 410 in the flange 411 of an angular element 412 of the frame 405 and there fixed by nuts 413 and 414. In this way, the nuts can be adjusted along the rods so that the shaping surface of the mold can be "leveled." The rods can also be shifted inwardly or outwardly within the limits of the slots 410 to accommodate molds of differing form and/or width.

Generally stated, the frame 405 is substantially rectangular in plan view, being formed of angular end elements 412 angular side elements 415 and angular elements 416 located in the medial area thereof (FIG. 9), and is carried by and is vertically movable with reference to a carriage generally designated by the numeral 420.

This carriage includes tubular support members 421, having contained sleeve bearings 422, by which it is slidably mounted on cylindrical rods 423. Each rod is secured adjacent its ends in blocks 424 bolted to beams 204 arranged transversely of and supported on the beams 202. As best seen in FIGS. 4 and 9, the tubular support members 421 are integrally joined with the horizontal and vertical flanges or legs 426 and 427 of side angular members 428 that are interjoined by angular members 429, 430 and 431, these latter members having upwardly directed vertical legs 432 and horizontally disposed legs 433.

An additional angle member 434 is fixed to the vertical flanges or legs 427 of the members 428 with the vertical leg 435 being directed downward and the other leg 436 being horizontal. A plate 438 is secured to the horizontal legs 433 of the angle members 430 and 431 to support a cylinder actuator 440 in substantially the center of the carriage, the actuator having the piston 441 and piston rod 442. The rod 442 has a connector block 443 attached to its outer end; the block being associated with and located between the angle members 416 of the frame 405 on a pin 444. Upon the application of sufficient pressure to the rod end of the cylinder actuator through pipe 445, the inward or upward movement of the rod 442 serves to raise the frame 405 and the bending mold 400 from the full line position in FIG. 2 to the upwardly disposed position indicated in phantom lines with enough momentum to cause a properly heated sheet supported on the mold to sag into conformity with its shaping surface 401. During vertical movement of the frame 405 in either direction, misalignment or swinging of the frame is restricted by a guide pin 447 associated with the frame 405 and which passes through a bearing block 448 fixed to the carriage 420.

The limits of vertical movement of the mold 400 are determined by pairs of nuts 450 and 451 on the threaded rods 452. As seen in FIG. 7, each rod is secured at its upper end in a block 453 fixed to the horizontal legs 426 of the angle member 428. Each rod 452 passes through a hole 454 provided in the horizontal leg of the frame side angles 415. Thus, in the mold position illustrated in FIG. 2, downward movement of the frame 405 has been halted by the pairs of nuts 450, while in that of FIGS. 1 and 9 the upward movement has been halted by the pairs of nuts 451.

After being raised, the carriage 420, with the mold 400 can be shuttled between the full line position, above the rolls 30, in FIG. 1 and the phanhom line position, between the tempering blast heads D, by a cylinder actuator 500 supported at its ends by brackets 501 on the transversely disposed beams 204 and connected at its ends to a controlled source of pressure by pipes 502 and 503. In the illustrated embodiment, the contained piston 505 (FIG. 4) is connected to one of the ends of lengths of cable 506 and 507, with each cable being trained about a pulley 508 supported by a bracket 501. The opposite end of each cable 506 and 507 is secured to a U-shaped bracket 509 mounted on horizontal leg 436 of the angle member 434 (FIG. 9).

During application of pressure through the pipe 502 to the cylinder 500, the carriage 420 is moved to the phantom line position of FIG. 1 (shown in full line in FIG. 10) and a cam follower 511, in a bracket 512 on the vertical leg 432 of the angle member 429, is brought into engagement with a cam 513; but motion of the carriage is gradually reduced when the angle member 429 is engaged by the rod 514 (FIG. 4) of a cushioning device 515 supported on the undersurface of a transversely disposed beam 205 mounted at its ends on the beams 202. A similar rod 516 of a cushioning device 517 supported on a beam 204 serves the same purpose at the opposite limit of carriage movement.

The cam 513 is mounted on a shaft 520, journaled in bearings 521 on a support bracket 522 that is adjustably bolted to a mounting plate 523 fixed to the beam 205. At its opposite end the shaft 520 has a fixed sprocket 525 which by chain belt 526 is coupled to sprocket 527 on the output shaft 528 of a motor unit 529, the same being supported by the bracket 522. Now, while pressure in the pipe 502 holds the follower 511 in a rolling contact with the cam 513, rotation of the cam will produce reciprocal motions of the carriage which have been found desirable in developing a satisfactory tempered condition in the glass sheets as they are subjected to streams of air from the blastheads D.

After a predetermined interval of time, the application of pressure to the cylinder actuator 500 can be reversed from the pipe 502 to the pipe 503 and the carriage 420 so moved to return the mold 400 and a bent and tempered glass sheet thereon to the position over the rolls 30 in the conveyor unit 25. Pressure can then be directed by pipe 446 to the head end of the cylinder actuator 440 to lower frame 405 and so return the bent temepered sheet onto the conveyor rolls for resumed forward movement toward and onto the rolls of the conveyor section B.

The embodiment of the apparatus of the invention as just described can be successfully used to bend and temper glass sheets ⅛" and under in thickness, using either high or low pressure air in the chilling or quenching step.

EXAMPLE I

Thus, a succession of flat glass sheets S, ⅛" thick and with an area of approximately 20 x 30 inches, to be used as automotive sidelights, were heated within the tunnel type furnace H to a temperature above their point of strain and to approximately their point of softening (around 1182° F.) while being moved along a horizontal path on the roller conveyor A at a speed of about 220" per minute. As each successive sheet neared the exit end of the furnace its speed was increased to about 430" per minute for movement out of the furnace and toward and onto the rolls 26 of the bending and tempering apparatus.

As soon as the sheet arrived at a position on the rolls 30 directly over the bending mold 400 it was stopped and the frame 405, with the mold supported therefrom, was moved rapidly vertically to lift the sheet bodily upward from the rolls and cause it to sag and bend by inertial and gravitational forces into conformity with the mold shaping surface 401.

Upon reaching their upper limits (full lines in FIG. 1) the frame and mold were immediately shunted laterally into the broken line position where the bent sheet on the mold was rapidly chilled by streams of air directed against its opposite surfaces from the blast heads D while the cam 513 was rotated to impart reciprocal movement to the frame, mold and glass sheet. The chilling was continued for 9 seconds using air at pressures of 25" (of water column) against the top surface and 22" against the bottom.

Thereafter the frame and mold were shunted back to their original raised position above the roller conveyor 25 and then lowered to deposit the bent and tempered sheet onto the rolls 30. From there movement of the sheet along its horizontal path was continued, by rotation of the rolls of the conveyor 25, over the rolls 26a and onto the conveyor B where it was additionally cooled between the blast heads C.

In this particular operation the draw time (from the time the glass left the furnace until it was fully within the blast heads D) was 5 seconds, and the complete cycle time per glass sheet, including the 9 second quenching or chilling time, was 20 seconds. The glass was completely tempered and had cooled to below 600° F. while still on the mold and the additional cooling by the blast heads C was only to bring it down to handling temperature.

Among the advantages of the procedure are that the glass is tempered immediately after bending, and the interior temperature of the sheet is reduced to below the annealing point of the glass before it leaves the mold. As a result there was no tendency for the bent tempered sheets to lose either curvature or temper when they were returned to the roller conveyor and, under inspection and tests, the glass showed better than average accuracy of bend, freedom from iridescence, and excellence of strain pattern.

With this particular embodiment, of course successive sheets emerging from the furnace and being fed into the bending and tempering apparatus must have what amounts to an interval approaching 20 seconds (the complete cycle time per sheet) between them. This can be cut somewhat because actual experience has demonstrated that the draw time can be reduced from 5 to 3 seconds.

However, by employing the slightly modified bending and tempering apparatus illustrated in FIGS. 11 and 12, the required gap between successive glass sheets can be made a nominal one. Thus the modified apparatus, as there shown, includes two bending mold structures 600 and 601 supported by carriages 602 and 603 both of which are adapted to be moved shuttle-wise along rods 604 (FIG. 12) in the same manner as the carriage 420 is moved along the rod 423, by their respective cylinder actuators 606 and 607. Also each carriage carries cylinder actuators 610 and 611, respectively, of which the associated rods 612 and 613 are attached to the frames 614 and 615 of the mold structures 600 and 601 to raise and lower the same. The cylinder actuators 610 is supplied from a controlled source of pressure by pipes 617 and 618 while the cylinder 611 is similarly supplied by pipes 619 and 620. It is to be understood that the head and rod ends of the cylinder actuators 610 and 611 are also connected to the pressure source by suitable piping and that other functioning structures, shown and described in connection with FIGS. 4 and 9, are also to be provided for the structure of FIGS. 11 and 12 so that the shuttle-wise motions of the carriages 602 and 603 will be cushioned or decelerated at each limit of their movements by devices such as the devices shown at 515 and 517. Also, with the carriage 602 or 603 in position to locate its related mold between the blastheads D or E, cams and cam followers are to be provided that will produce the desired reciprocal motion during the chilling or tempering period.

EXAMPLE II

Except that the succession of heated glass sheets emerging from the furnace and being moved into the bending and tempering apparatus are spaced more closely together, the embodiment of the invention illustrated in FIGS. 11 and 12 may be used in the same way as described in Example I until the first heated sheet has been bent on the mold 601 and moved into quenching position between the blastheads E.

By this time the mold 600 should be in position, and be rapidly raised by the cylinder actuator 610, to lift the next succeeding sheet from the rolls of the conveyor 25 (phantom lines in FIG. 11) and bend it by inertia and gravity into conformity with the shaping surface. Upon application of pressure through pipe 617, the cylinder actuator 606 produces movement of the carriage 602 to deliver the mold 600 and the bent sheet thereon between the blastheads D where reciprocal motions will be imposed on the frame 614 and chilling continued to temper the bent glass.

In the meantime, upon completion of the quenching period between the blastheads E, the cylinder actuator 607 is caused, by the application of pressure through the pipe 619, to produce movement of the carriage 603 to carry the mold 601 and glass sheet back to the position above the rolls 30. In this position, application of pressure to the head end of the cylinder actuator 611 causes lowering of the mold and bent sheet to permit the sheet to continue its movement over the conveyor 25. At the same time the mold 601 will be in position to lift and bend the next sheet of heated glass, as soon as it arrives at a position thereabove. Whereupon, and with the application of pressure by pipe 620 to the cylinder actuator 607, the carriage 603 will be moved to again bring the mold 601 into chilling position between the blastheads E.

Similarly the carriage 602 will, in its turn, be moved to return the mold 600 and the bent and tempered glass sheet thereon to the location where it can be lowered onto the rolls 30 and the mold positioned to pick up the next heated sheet.

In other words this embodiment provides a double acting shuttle arrangement in which alternate ones of successive sheets being fed from the heating furnace to the bending and tempering apparatus can be lifted, bent and shuttled to opposite sides of the apparatus for the quenching step; or, differently stated, one mold with a bent sheet on it will be shunted into the blastheads on the right while the other mold is waiting to pick up and bend the next sheet and shunt it into the blastheads on the left. This substantially doubles the capacity, by reducing the complete cycle time for each sheet to around 12 seconds, and at the same time improves glass quality by closing the gap between successive sheets moving through the furnace.

In the preferred embodiments of the invention, the sheet is rapidly chilled as soon as possible after bending and this chilling continued until the glass is completely quenched or tempered, i.e., until the inside temperature of the glass is at a point below its annealing temperature so that any possibility of latent internal heat subsequently exerting an annealing effect is past. Nevertheless, in its broader aspects, the invention is usable in a procedure where the initial chilling of the sheet is primarily to set the bend either with or without subsequent or ultimate tempering of the glass. Also, as pointed out above, cooling or chilling fluids at high pressures and low volume or at low pressures in high volume are usable with the invention; and sheets of various thicknesses can be treated effectively.

Indeed, it is to be understood that the forms of the invention herewith shown and described are to be taken as illustrative embodiments only of the same, and that various changes in the size shape and arrangement of parts, as well as various procedural changes, may be resorted to without departing from the spirit of the invention as defined in the following claims.

I claim:

1. In a method of bending and tempering glass sheets in which a flat sheet of glass is heated to bending temperature during movement along a substantially horizontal path, the heated flat sheet is lifted from said path into a plane thereabove on the contoured shaping surface of a bending mold at a speed sufficient to create an inertial force which when combined with the force of gravity causes said sheet to settle against and bend into conformity with said shaping surface, and the bent sheet is subsequently lowered on said mold to return it to said path for continued movement therealong and in the plane thereof; the improvement which comprises shuttling and shilling said sheet immediately after it has been lifted and bent and while it is supported against said shaping surface by first moving the same horizontally and laterally into a location out of vertical alignment with said path and in said plane thereabove; then chilling said lifted and bent sheet while in said location to temper the glass on the mold, and thereafter moving said bent and tempered sheet horizontally back into vertical alignment with and in said plane above said path, before lowering said mold to reutrn said sheet to said path for continued movement therealong and in the plane thereof.

2. A method as defined in claim 1 in which said chilling comprises applying cooling fluid against opposite surfaces of said bent and lifted sheet, and creating relative reciprocal movement between said sheet and said fluid, while said sheet is in said location.

3. A method as defined in claim 2 in which said cooling fluid is applied by directing streams thereof against said surfaces, said movement is created by reciprocating said sheet horizontally in said location and in the directions of said shuttled movement, and tempering is completed before returning said sheet to said path.

4. A method aes defined in claim 3 in which the speed of said shuttled movement is reduced and said streams of cooling fluid are directed against said surfaces as said sheet is being shuttled into said location.

5. A method as defined in claim 1 in which a succession of flat sheets are so heated, lifted and bent, and alternate lifted and bent sheets are shuttled to locations out of vertical alignment with and at opposite sides of said path for said chilling step.

6. In apparatus for bending and tempering glass sheets, the combination; with a horizontal conveyor for supporting flat glass sheets and bent tempered glass sheets in and moving them along a predetermined path, a bending mold having a shaping surface, and means for moving said mold vertically between a lowered position below said path and a raised position thereabove to lift a glass sheet from said conveyor and cause it to bend by inertia and gravity against said shaping surface and to subsequently return the bent glass sheet to said path for continued movement therealong; of means operable immediately after said bending for shuttling said mold horizontally and laterally and in a plane above said path between said raised position and a location spaced laterally and to one side of said path to shift said sheet out of and then return it into vertical alignment with said path, and means at and associated with said location for chilling said bent glass sheet in said location.

7. Apparatus as defined in claim 6 in which said chilling means comprises opposed blast heads for directing streams of said fluid toward each other, and means associated with said shuttling means are provided for reducing said shuttling speed as said mold moves into position between said blast heads and for reciprocating said mold in the path of said shuttling while it is in said lateral location between said blast heads.

8. Apparatus as defined in claim 6 in which separate molds with separate operating means are provided for alternate sheets moving along said path, and means are provided for shuttling said molds to shift alternate glass sheets out of alignment with said path at opposite sides thereof, and means are provided at both of said sides for chilling said shifted bent glass sheets.

References Cited
UNITED STATES PATENTS

| 3,607,200 | 9/1971 | McMaster | 65—106 X |
| 3,476,540 | 11/1969 | Ritter, Jr. et al. | 65—106 X |
| 3,607,200 | 9/1971 | McMaster | 65—106 X |

ARTHUR D. KELLOGG, Primary Examiner

U.S. Cl. X.R.

65—107, 273, 285, 289